United States Patent [19]

Stokes

[11] Patent Number: 4,631,433
[45] Date of Patent: Dec. 23, 1986

[54] PLASTIC END SHIELD WITH THERMAL BARRIER FOR DYNAMOELECTRIC MACHINES

[75] Inventor: Vijay K. Stokes, Schenectady, N.Y.

[73] Assignee: General Electric Company, Schenectady, N.Y.

[21] Appl. No.: 730,889

[22] Filed: May 6, 1985

[51] Int. Cl.⁴ .......................... H02K 5/08; H02K 9/00
[52] U.S. Cl. ........................................ 310/89; 411/531
[58] Field of Search ................. 310/43, 65, 85, 89, 310/90, 68 D, 58; 384/277, 441; 411/531, 542, 546, 904, 907, 908; 524/611; 361/103, 115

[56] References Cited

U.S. PATENT DOCUMENTS

| | | | |
|---|---|---|---|
| 2,810,084 | 10/1957 | Sprando | 310/43 |
| 3,255,559 | 6/1966 | Gaeth et al. | 411/531 |
| 3,490,820 | 1/1970 | Lewis | 310/85 |
| 3,527,971 | 9/1970 | Means | 310/68 D |
| 3,760,209 | 9/1973 | Hult | 310/90 |
| 4,098,754 | 7/1978 | Neuray et al. | 524/611 |
| 4,355,253 | 10/1982 | Vollbrecht | 310/43 |
| 4,384,224 | 5/1983 | Spitler et al. | 310/43 |
| 4,530,952 | 7/1985 | Tayama et al. | 524/611 |
| 4,549,242 | 10/1985 | Nebon et al. | 361/115 |

Primary Examiner—Patrick R. Salce
Assistant Examiner—D. L. Rebsch
Attorney, Agent, or Firm—Jeffrey L. Brandt; James C. Davis, Jr.; Paul R. Webb, II

[57] ABSTRACT

A plastic end shield for use in a dynamoelectric machine of the type having a rotor assembly rotatably disposed in a housing includes an end plate for attachment to the housing, so as to provide structural support for one end of the rotor assembly, and a thermal barrier adjacent to the end plate for thermally insulating the end plate from heat generated inside the housing. In a preferred embodiment, radial and circumferential support members and axial and circumferential reinforcing ribs are employed in order to efficiently utilize the plastic material. The thermal barrier may be provided with a plurality of vent openings through which heat generated inside the housing can escape from the housing and the end plate. Means employed to attach the end plate and thermal barrier to the housing may include a thermally insulative material which prevents heat from being conducted from the housing to the end plate.

20 Claims, 12 Drawing Figures

PLASTIC END SHIELD WITH THERMAL BARRIER FOR DYNAMOELECTRIC MACHINES

BACKGROUND OF THE INVENTION

This invention relates to dynamoelectric machines. More particularly, it relates to plastic end shields for use in such dynamoelectric machines as motors, generators, and the like.

Conventional dynamoelectric machines typically include a housing, a rotor assembly rotatably disposed in the housing, and one or more end shields which provide structural support for associated axial ends of the rotor assembly. The end shields are usually made of steel, aluminum, cast iron, or other die cast alloy. Plastic end shields have also been used in the past, but only for very small motors. Plastic end shields have typically been employed in motors for such applications as toys and small appliances, where very little heat is generated inside the motor housing. For such applications, employing plastic end shields as a substitute for metal end shields has required little more than using a plastic material in the same mold that would be used to make a metal end shield for the same application.

However, for more demanding applications, such as, for example, motors of horsepower ratings above 0.05 horsepower, a significant amount of heat is generated inside the motor housing, and the end shields for the motor are subjected to temperatures as high as 200° C. While such temperatures do not present any significant problems when metal end shields are employed, such elevated temperatures in plastic end shields may cause deterioration of the mechanical properties of the plastic material, and excessive creep in the plastic structure. Most of the relatively inexpensive plastic materials currently available exhibit durable mechanical properties at relatively low temperatures. At higher temperatures, however, the mechanical properties of the material deteriorate significantly. As a result, end shields made of such materials may fail in their primary function of maintaining the proper distance between the outermost radius of the rotor assembly and the innermost radius of the housing, which distance is often referred to as the rotor-stator air gap. Plastic materials capable of withstanding higher temperatures are available, but such materials are relatively expensive and generally do not offer any cost savings over metal end shields. Thus, while end shields made from inexpensive plastic materials would be much lighter than the metal end shields currently employed, and would offer the potential for reducing manufacturing costs, it is not feasible to directly substitute such plastic materials in the metal end shield designs currently employed for dynamoelectric machines which generate a significant amount of heat inside the housing.

Furthermore, the primary motivation for replacing metal end shields with plastic end shields is not the cost of the material itself (which, in many applications, is greater for plastics than for metals), but rather a reduction in the overall manufacturing cost of the end shield. Because relatively complex parts can be molded from plastics, a metal assembly involving several different components can often be replaced by a single plastic part, at a lower overall manufacturing cost. Thus, an effective exploitation of the advantages provided by using plastics to form an end shield requires a design in which multi-functionality can be incorporated into the end shield. In dynamoelectric machines, besides serving to maintain the rotor-stator air gap, the end shields also often perform such functions as providing an oil reservoir or grease cavity around the bearings, serving as a mounting bracket, or providing a mount for such accessories as tachometers, brakes, blowers, switches, or brush rings. Plastic end shields can be designed to combine several of these functions. For example, since plastic is an electrically insulative material, the brush support ring used in D.C. machines can be formed as an integral part of the end shield. By providing multi-functionality in this manner, plastic end shields can offer significant reductions in overall manufacturing costs.

Accordingly, it is an object of the present invention to provide an end shield for dynamoelectric machines which is light in weight and inexpensive to manufacture.

It is also an object of the present invention to provide an end shield capable of withstanding relatively high temperatures caused by heat generated inside the machine housing.

It is a further object of the present invention to provide an end shield which is made from plastic.

SUMMARY OF THE INVENTION

A plastic end shield for a dynamoelectric machine of the type having a rotor assembly rotatably disposed in a housing comprises an end plate for attachment to the housing so that the end plate provides structural support for one end of the rotor assembly, and a thermal barrier located adjacent to the end plate and disposed so as to thermally insulate the end plate from heat generated inside the housing. In a preferred embodiment, the end shield comprises a bearing boss, for receiving a bearing assembly associated with the rotor assembly, and a mounting member at least partially surrounding the bearing boss, for attaching the end plate to the housing. A plurality of radial support members connects the bearing boss to the mounting member. The end plate may also include circumferential support members which connect the radial support members to each other. The thermal barrier preferably comprises a plastic which is capable of withstanding relatively high temperatures, and may further include a plurality of vent openings through which the heat generated inside the housing is directed out of the housing and away from the end plate. Means for attaching the end plate and the thermal barrier to the housing preferably includes a thermally insulative material which prevents heat from being conducted from the housing to the end plate.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which:

DETAILED DESCRIPTION OF THE PREFERRED EMBODIMENT

Figure 1:
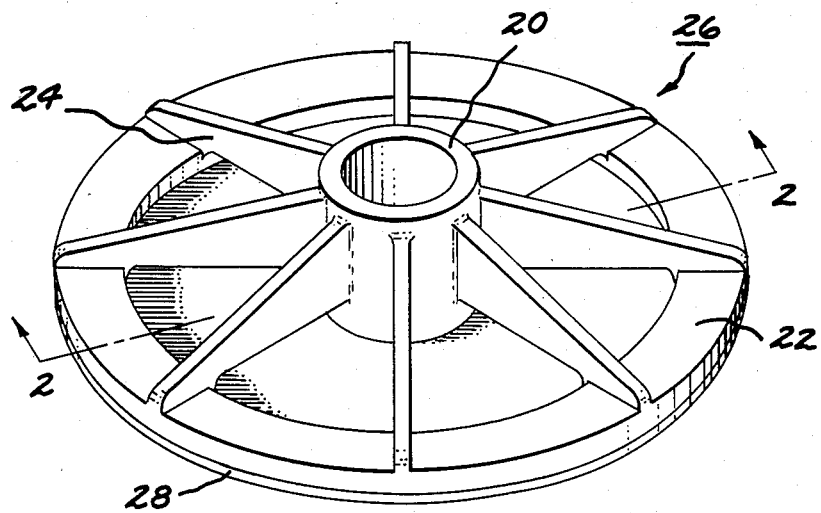
FIG. 1 is a perspective view schematically illustrating one embodiment of an end shield for a dynamoelectric machine, in accordance with the present invention.

FIG. 1 schematically illustrates one embodiment of an end shield for a dynamoelectric machine of the type having a rotor assembly rotatably disposed in a housing, in accordance with the present invention. The end shield comprises end plate 26, for attachment to the housing (not shown) so that end plate 26 provides structural support for one axial end of the rotor assembly (also not shown), and thermal barrier 28 located adjacent to end plate 26. End plate 26 is attached to the housing of the dynamoelectric machine so as to maintain a predetermined distance between the radially outermost portion of the rotor assembly and the radially innermost portion of the housing. Thermal barrier 28 is disposed so as to thermally insulate end plate 26 from heat generated inside the housing. Thus, the end shield of the present invention comprises two elements: a load-carrying portion that structurally supports an associated end of the rotor assembly and thereby maintains the rotor-stator air gap, and a thermally insulative portion which thermally insulates the load-carrying portion from heat generated inside the housing of the dynamoelectric machine. Employing thermal barrier 28 to thermally insulate end plate 26 in the manner provided by the present invention protects end plate 26 from the relatively high temperature caused by heat generated inside the machine housing, thereby avoiding the deterioration of the end plate's mechanical properties and the excessive creep that might otherwise occur when end plate 26 is formed from a plastic material. In a preferred embodiment, thermal barrier 28 comprises a plastic which has low thermal conductivity and which is capable of withstanding temperatures of approximately 150° C. to 200° C. Suitable materials for thermal barrier 28 include the class of plastics known as phenolics, and also the polyetherimide resin produced by General Electric Company under the designation of Ultem ®. End plate 26 preferably comprises a high strength plastic, such as, for example, any of the General Electric Company materials known as Lexan ® polycarbonate resin, Valox ® thermoplastic resin, or Ultem ® resin. To provide end plate 26 with additional stiffness, the plastic material may be filled with a stiffening material, such as, for example, glass filaments.

For typical conventional dynamoelectric machines, in which the housing surrounds the rotor assembly, end plate 26 preferably comprises bearing boss 20 at least partially surrounded by mounting member 22, in the manner illustrated in FIG. 1. Bearing boss 20 is configured so as to receive a bearing assembly associated with the dynamoelectric machine's rotor assembly (not shown in the Figures). Mounting member 22 serves to attach end plate 26 to the machine housing (also not shown in the Figures). A plurality of radial support members 24 connects bearing boss 20 to mounting member 22. Radial support members 24 are disposed so as to support bearing boss 20 in position relative to mounting member 22. In the embodiment shown in FIG. 1, bearing boss 20 and mounting member 22 are each generally annularly shaped. Bearing boss 20 and mounting member 22 are further disposed so that the central axis of bearing boss 20 is substantially coaxially located with respect to the central axis of mounting member 22. Also, in the embodiment shown, each radial support member 24 extends between bearing boss 20 and mounting member 22 in a radial direction with respect to the central axis of bearing boss 20. In order to most economically produce end plate 26, and to provide it with maximum mechanical strength, bearing boss 20, mounting member 22, and radial support members 24 may be formed as a unitary structure.

Figure 2:
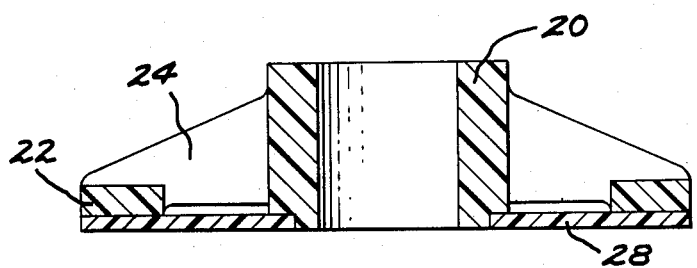
FIG. 2 is a side elevation, cross-sectional view of the end shield shown in FIG. 1, taken along line 2—2.
Figure 3:
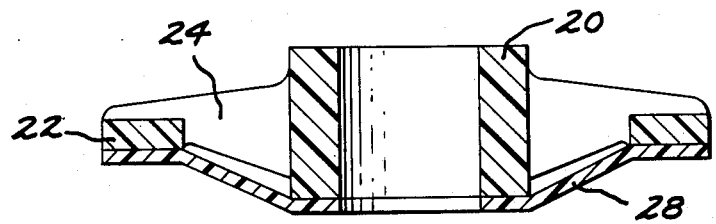
FIG. 3 is a similar view to that of FIG. 2, schematically illustrating an alternative embodiment to that shown in FIG. 2.

In the embodiment shown in FIG. 1, thermal barrier 28 also comprises an annularly shaped structure. As is better illustrated in FIG. 2, which is a cross-sectional view taken along line 2—2 of the end shield of FIG. 1, thermal barrier 28 in the embodiment shown in FIG. 1 is a relatively thin, substantially flat structure. However, thermal barrier 28 need not be flat in order to perform its function of thermally insulating end plate 26 from heat generated inside the machine housing. Thermal barrier 28 may also comprise other shapes, such as the annular structure shown in the alternative embodiment of the present invention shown in FIG. 3. Furthermore, thermal barrier 28 may extend radially throughout the radial distance between the innermost radius of bearing boss 20 and the outermost radius of mounting member 22, in the manner illustrated in FIG. 3, or for some lesser radial distance, in the manner illustrated in FIG. 2. The actual radial extent of thermal barrier 28 for a particular application depends upon the amount of thermal insulation required to be provided by thermal barrier 28 for that application. Also, in order to further protect radial support members 24 from heat generated inside the machine housing, each radial support member 24 is preferably further disposed so as to be spaced apart from thermal barrier 28, in the manner illustrated in FIGS. 2 and 3.

Figure 4:
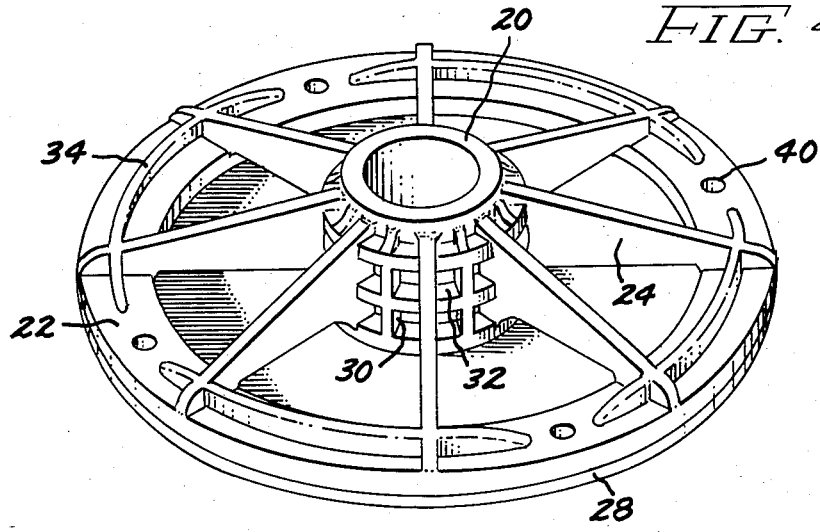
FIG. 4 is a perspective view schematically illustrating a second embodiment of an end shield for a dynamoelectric machine, in accordance with the present invention.

As is schematically illustrated by the embodiment of the present invention shown in FIG. 4, bearing boss 20 may further include a plurality of reinforcing ribs 30 and 32 formed as an integral part of bearing boss 20. Axial reinforcing ribs 30 are located in a spaced-apart relationship around the outer circumference of bearing boss 20, with each axial reinforcing rib 30 extending in a direction which is parallel to the central axis of bearing boss 20. Circumferential reinforcing ribs 32 extend around the outer circumference of bearing boss 20, and are located in a spaced-apart relationship along the central axis of bearing boss 20. Axial reinforcing ribs 30 and circumferential reinforcing ribs 32 serve to provide bearing boss 20 with additional resistance to radial and axial distortion forces acting upon bearing boss 20. By employing reinforcing ribs 30 and 32 in this manner, the material used to form bearing boss 20 is more efficiently utilized. As is also illustrated in FIG. 4, mounting member 22 may further include a plurality of reinforcing ribs 34 which extend in a circumferential direction with respect to the central axis of mounting member 22. Mounting member reinforcing ribs 34 are disposed so as to provide additional structural support between mounting member 22 and each of radial support members 24, thereby further facilitating efficient material utilization. By distributing the plastic material in the manner illustrated, so as to move material from regions of low stress to regions of high stress, the amount of plastic material required to achieve a given level of mechanical strength for the end shield can be reduced.

Figure 5:
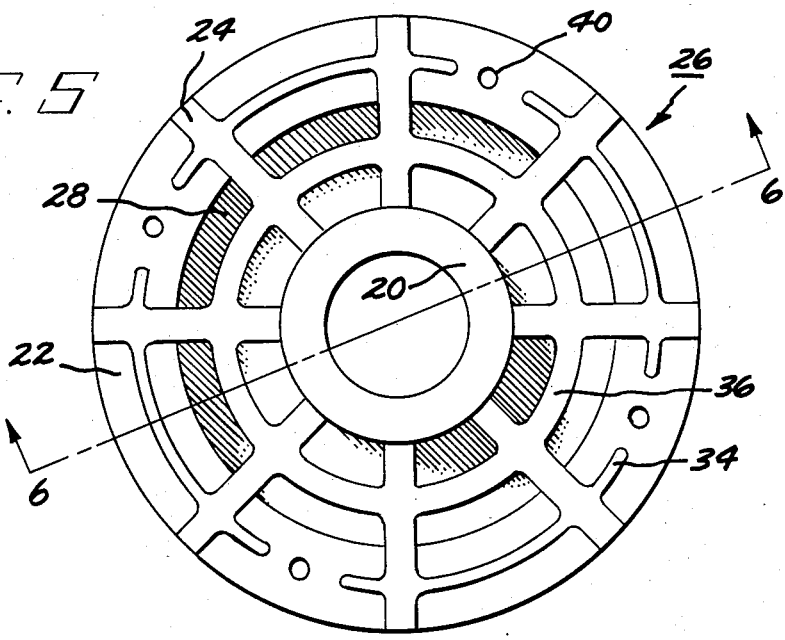
FIG. 5 is an end view schematically illustrating a third embodiment of an end shield in accordance with the present invention.
Figure 6:
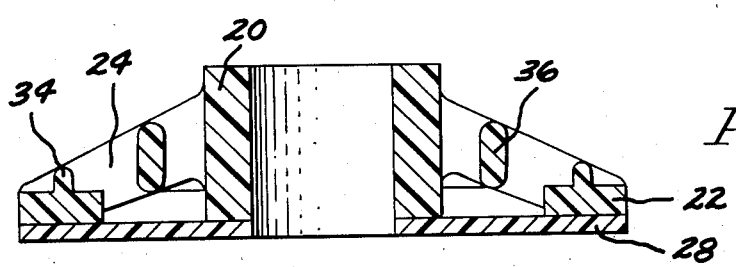
FIG. 6 is a side elevation, cross-sectional view of the end shield shown in FIG. 5, taken along line 6—6.
Figure 7:
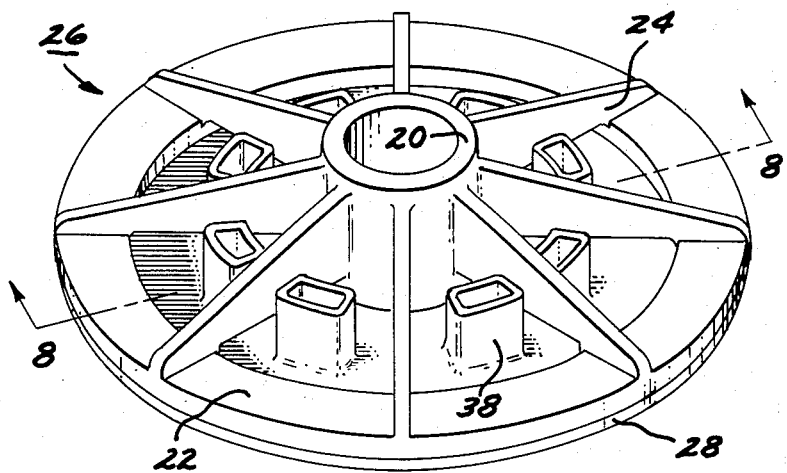
FIG. 7 is a perspective view schematically illustrating a fourth embodiment of an end shield in accordance with the present invention.
Figure 8:
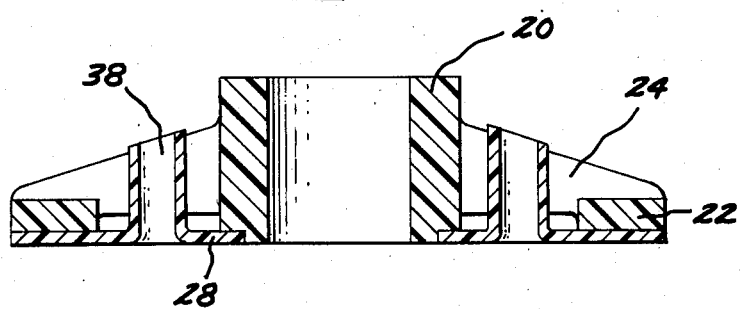
FIG. 8 is a side elevation, cross-sectional view of the end shield shown in FIG. 7, taken along line 8—8.

FIG. 5 schematically illustrates an alternative embodiment of the present invention in which end plate 26 further includes a plurality of circumferential support members 36. Circumferential support members 36 extend in a circumferential direction with respect to the central axis of bearing boss 20, and are radially located with respect thereto between the outermost radius of bearing boss 20 and the innermost radius of mounting member 22. Each circumferential support member 36 is disposed so as to connect at least two of radial support members 20 to each other. As is illustrated in FIG. 6, which is a cross-sectional view taken along line 6—6 of the end shield shown in FIG. 5, circumferential support members 36 are preferably further disposed so as to be spaced apart from thermal barrier 28. With circumferential support members 36 and radial support members 24 spaced apart from thermal barrier 28 in the manner shown in FIG. 6, support members 24 and 36 are better protected from heat generated inside the machine housing.

The embodiments of the present invention illustrated in FIGS. 1-6 are especially useful for "non-ventilated" dynamoelectric machines, for which air flow through the end shield is not required. Non-ventilated end shields are employed in such applications as, for example, totally enclosed motors. When non-ventilated plastic end shields are employed in these applications, the motor should be designed to efficiently remove heat generated inside the motor by conduction of the heat through the motor housing.

For applications requiring air flow through the end shield, the embodiments of the present invention illustrated in FIGS. 7-10 are preferred. For such applications, thermal barrier 28 further includes means for directing heat generated inside the housing through thermal barrier 28 and away from end plate 26. In the embodiment illustrated in FIG. 7, this heat directing means comprises a plurality of vent openings 38 through thermal barrier 28. Vent openings 38 are arranged in a spaced-apart relationship about the central axis of thermal barrier 28, and are radially located with respect thereto between the outermost radius of bearing boss 20 and the innermost radius of mounting member 22. Vent openings 38 are also chimney shaped and disposed so that fluid flowing out of the machine housing (not shown in FIG. 7) through vent openings 38 is directed away from the structural components of end plate 26.

Figure 9:
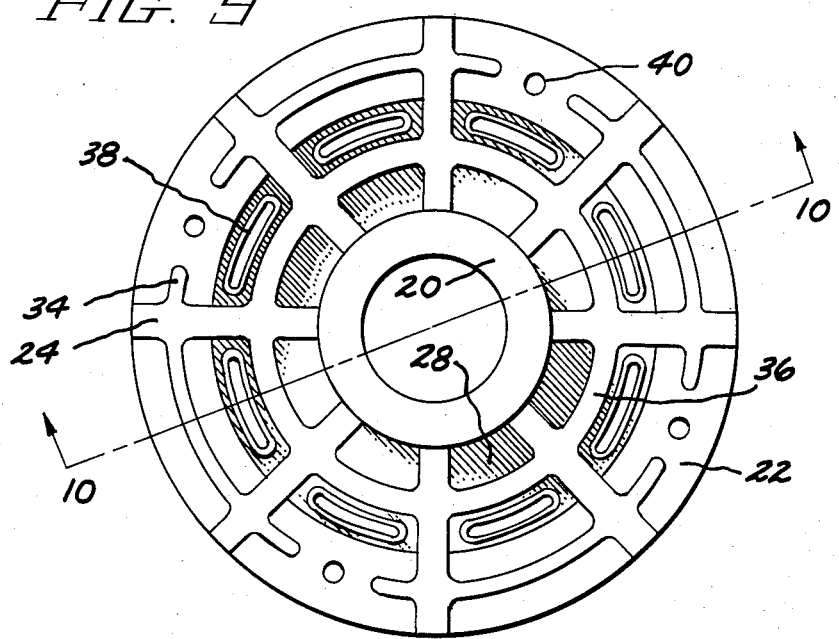
FIG. 9 is a view similar to that of FIG. 5, schematically illustrating an end shield in accordance with a fifth embodiment of the present invention.
Figure 10:
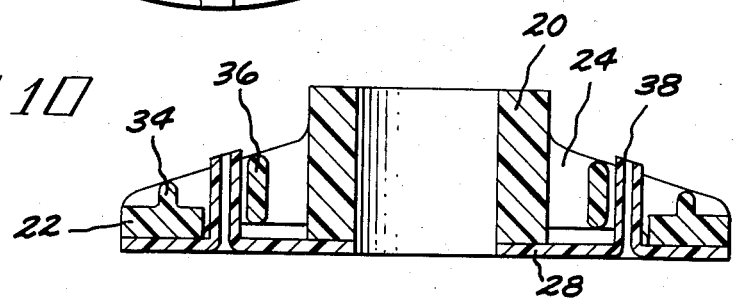
FIG. 10 is a side elevation, cross-sectional view of the end shield shown in FIG. 9, taken along line 10—10.

As is illustrated in FIGS. 9 and 10, ventilated end shields in accordance with the present invention may also include mounting member reinforcing ribs 34 and circumferential support members 36, in the same manner as illustrated in FIGS. 4-6 and described above in relation thereto. Similarly, although not shown in FIGS. 7-10, bearing boss 20 of a ventilated end shield in accordance with the present invention may include axial and circumferential reinforcing ribs, in the manner illustrated by reinforcing ribs 30 and 32 shown in FIG. 4 and described above in relation thereto. Additionally, while vent openings 38 are shown in cross-section in FIGS. 8 and 10 as being in the form of spouts or ducts, other shapes which perform the same function of carrying hot air out of the machine housing and directing it away from the structural components of the end shield may also be utilized. For vent opening shapes which accomplish this function, the load-bearing portions of the plastic end shield are not exposed to the hot air exiting from the interior of the machine housing, and are thereby protected from deterioration caused by such heat.

Figure 11:
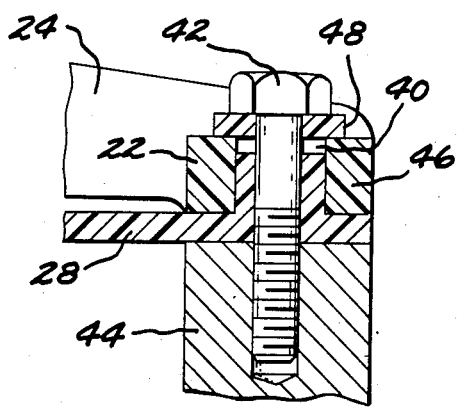
FIG. 11 is a side elevation, cross-sectional view schematically illustrating one embodiment of a means for attaching the end shield to the housing of a dynamoelectric machine, in accordance with the present invention.
Figure 12:
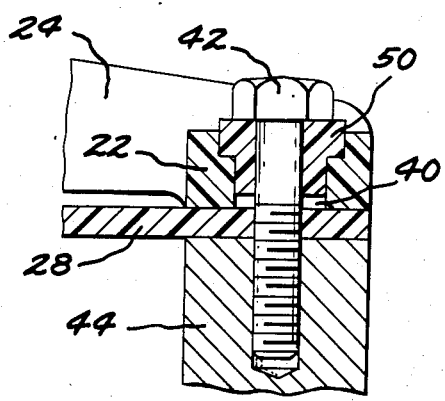
FIG. 12 is a view similar to that of FIG. 11 schematically illustrating an alternative embodiment for the attaching means shown in FIG. 11.

The end shield of the present invention further comprises means for attaching the end plate and the thermal barrier to the machine housing. In the embodiment schematically illustrated in FIG. 11, the attaching means comprises fastening screws 42, each disposed through associated screw opening 40, respectively, and extending through mounting member 22 and also through thermal barrier 28, into the motor housing (not shown). In order to prevent conduction of heat by fastening screws 42 from housing 44 to mounting member 22, each fastening screw 42 is preferably thermally insulated from mounting member 22 by a respective thermally insulative material disposed between the adjacent surfaces of the respective fastening screw 42 and mounting member 22. In the embodiment shown in FIG. 11, this thermally insulative material comprises thermal barrier insert 46 which at least partially protrudes into screw opening 40, and insulative washer 48 disposed between mounting member 22 and the head of fastening screw 42. In an alternative embodiment to that shown in FIG. 11, which is schematically illustrated in FIG. 12, the thermally insulative material respectively disposed between the adjacent surfaces of each of fastening screws 42 and mounting member 22 comprises thermally insulative sleeve 50. A thermally insulative sleeve 50 is disposed, respectively, in each of screw openings 40 and each sleeve 50 protrudes from its respective screw opening 40 so as to thermally insulate all adjacent portions of the respective fastening screw 42 from mounting member 22. By thermally insulating each fastening screw 42 from mounting member 22 in the manner illustrated in FIGS. 11 and 12, heating of mounting member 22, which heating might cause elevated temperatures and associated creep in the plastic material surrounding each of screw openings 40, is reduced.

The foregoing describes an end shield for dynamoelectric machines, which end shield can be made from plastic materials while at the same time being capable of withstanding the relatively high temperatures caused by heat generated inside the machine housing of many conventional dynamoelectric machines. The present invention provides a means for thermally insulating the structural components of the end shield from this heat, thereby facilitating making the end shield from plastic materials which are low in weight and inexpensive to manufacture.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The inventioned claimed is:

1. An end shield for a dynamoelectric machine of the type having a rotor assembly rotatably disposed in a housing, said end shield comprising:
   an end plate comprising high strength plastic attached to said housing for providing structural support for one axial end of said rotor assembly and for maintaining a predetermined distance between the radially outermost portion of said rotor assembly and the radially innermost portion of said housing; and
   a substantially solid thermal barrier comprising a plastic plate having both a low thermal conductivity and an ability to withstand heat in the range of approximately 150–200 degrees centigrade located adjacent to said end plate and disposed so as to thermally insulate said end plate from connective heat generated inside said housing.

2. The end shield of claim 1 wherein said thermal barrier further includes means for directing (therethrough) heat generated inside of said housing out of said housing and away from said end plate.

3. The end shield of claim 1 further comprising means for attaching said end plate and said thermal barrier to said housing.

4. The end shield of claim 1 wherein said end plate comprises:
   a bearing boss, for receiving a bearing assembly associated with said rotor assembly;
   a mounting member at least partially surrounding said bearing boss, for attaching said end plate to said housing; and
   a plurality of radial support members connecting said bearing boss to said mounting member, with said radial support members being disposed so as to support said bearing boss in position relative to said mounting member.

5. The end shield of claim 4 wherein each said radial support member is further disposed so as to be spaced apart from said thermal barrier.

6. The end of shield claim 4 wherein said bearing boss, said mounting member, and said radial support members comprise a unitary structure.

7. The end shield of claim 6 wherein said bearing boss and said mounting member are each generally annularly shaped and are disposed so that the central axis of said bearing boss is substantially coaxially located with respect to the central axis of said mounting member, and wherein each said radial support member extends between said bearing boss and said mounting member in a radial direction with respect to said central axis of said bearing boss.

8. The end shield of claim 7 wherein said end plate further includes a plurality of circumferential support members extending in a circumferential direction with respect to said central axis of said bearing boss, said circumferential support members being radially located between the outermost radius of said bearing boss and the innermost radius of said mounting member, with each said circumferential support member being disposed so as to connect at least two of said radial support members to each other.

9. The end shield of claim 8 wherein each said circumferential support member is further disposed so as to be spaced apart from said thermal barrier.

10. The end shield of claim 7 wherein said bearing boss includes a plurality of reinforcing ribs formed as an integral part of said bearing boss, with said reinforcing ribs being disposed around the outer circumference of said bearing boss so as to provide said bearing boss with additional resistance to radial and axial distortion forces acting on said bearing boss.

11. The end shield of claim 7 wherein said mounting member includes a plurality of reinforcing ribs disposed so as to provide additonal structural support between said mounting member and said plurality of radial support members.

12. The end shield of claim 7 wherein said thermal barrier comprises a generally annularly shaped structure disposed so that the central axis thereof is substantially coaxially located with respect to the central axis of said bearing boss.

13. The end shield of claim 12 wherein said thermal barrier extends radially between the innermost radius of said bearing boss and the outermost radius of said mounting member.

14. the end shield of claim 12 wherein said thermal barrier comprises a substantially flat structure.

15. The end shield of claim 2 wherein said heat directing means includes a plurality of chimney shaped vent openings through said thermal barrier and disposed so that fluid flowing out of said housing through said vent openings is directed away from said end plate.

16. The end shield of claim 15 wherein said vent openings are further arranged in a spaced-apart relationship about the central axis of said thermal barrier.

17. The end shield of claim 3 wherein said attaching means comprises a plurality of fastening screws, each of said screws extending through an associated screw opening, respectively, in said thermal barrier and also through an associated screw opening, respectively, in said end plate, each of said fastening screws being thermally insulated from said end plate by thermally insulative material situated between the adjacent surfaces of each of said screws and said end plate.

18. The end shield of claim 17 wherein said thermally insulative material between each of said screws and said end plate comprises a thermally insulative sleeve disposed, respectively, in each of said screw openings, respectively, in said end plate.

19. The end shield of claim 4 wherein said thermal barrier comprises a substantially solid plate extending between said bearing boss and said mounting member.

20. The end shield of claim 19 wherein said thermal barrier comprises a phenolic or ULTEM polyetherimide resin.

* * * * *